United States Patent
Tuliani et al.

(10) Patent No.: US 10,182,127 B2
(45) Date of Patent: *Jan. 15, 2019

(54) APPLICATION-DRIVEN CDN PRE-CACHING

(71) Applicant: Microsoft Technology Licensing, LLC, Redmond, WA (US)

(72) Inventors: Jonathan Roshan Tuliani, Dublin (IE); Nicholas Leonard Holt, Seattle, WA (US); Cheng Huang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/050,217

(22) Filed: Feb. 22, 2016

(65) Prior Publication Data

US 2016/0173639 A1   Jun. 16, 2016

Related U.S. Application Data

(63) Continuation of application No. 13/328,444, filed on Dec. 16, 2011, now Pat. No. 9,294,582.

(51) Int. Cl.
*G06F 15/16* (2006.01)
*H04L 29/08* (2006.01)
(Continued)

(52) U.S. Cl.
CPC ...... *H04L 67/2842* (2013.01); *G06F 12/0862* (2013.01); *G06F 17/30902* (2013.01);
(Continued)

(58) Field of Classification Search
CPC ........... G06F 17/30902; G06F 12/0862; G06F 2212/602; G06F 2212/6024;
(Continued)

(56) References Cited

U.S. PATENT DOCUMENTS 5,991,306 A     11/1999  Burns et al.
6,038,601 A  *   3/2000  Lambert .......... G06F 17/30902
                                                 370/468
(Continued)

FOREIGN PATENT DOCUMENTS

CN     101023627 A    8/2007
CN     101809614 A    8/2010
(Continued)

OTHER PUBLICATIONS

International Search Report, dated Mar. 29, 2013, Application No. PCT/US2012/068326, Filed date: Dec. 7, 2012, pp. 9.
(Continued)

*Primary Examiner* — Liang Che A Wang
*Assistant Examiner* — Johnny B Aguiar
(74) *Attorney, Agent, or Firm* — Fiala & Weaver P.L.L.C.

(57) ABSTRACT

Techniques are provided for the caching of content prior to the content being requested. A request for desired content may be received from a client application at a caching server. The request may also indicate additional content related to the desired content that may be subsequently requested by the client application. The indicated additional content (and the desired content, if not already cached) is retrieved from an origin server. The desired content is transmitted to the client application at the user device, and the additional content is cached at the caching server. Subsequently, a second request may be received from the client application that includes a request for the additional content. The additional content, which is now cached at the caching server, is served to the client application by the caching server in response to the second request (rather than being retrieved from the origin server).

20 Claims, 6 Drawing Sheets

(51) Int. Cl.
  *G06F 12/0862* (2016.01)
  *G06F 17/30* (2006.01)
(52) U.S. Cl.
  CPC ............ *G06F 2212/602* (2013.01); *G06F 2212/6028* (2013.01); *H04L 29/0881* (2013.01); *H04L 29/08729* (2013.01); *H04L 29/08801* (2013.01); *H04L 67/2847* (2013.01)
(58) Field of Classification Search
  CPC ..... G06F 2212/6026; G06F 2212/6028; H04L 67/2842; H04L 67/2847; H04L 29/0881; H04L 29/08729; H04L 29/08801
  USPC ............... 709/203, 213, 217, 219, 223, 224
  See application file for complete search history.

(56) References Cited

U.S. PATENT DOCUMENTS

| | | | |
|---|---|---|---|
| 6,085,226 A * | 7/2000 | Horvitz | G06F 17/30902 707/E17.12 |
| 6,173,318 B1 * | 1/2001 | Jackson | G06F 17/30902 707/E17.12 |
| 6,199,154 B1 | 3/2001 | Witt | |
| 6,542,964 B1 | 4/2003 | Scharber | |
| 6,701,316 B1 | 3/2004 | Li et al. | |
| 7,975,025 B1 | 7/2011 | Szabo et al. | |
| 8,019,811 B1 | 9/2011 | Britto et al. | |
| 8,341,245 B1 * | 12/2012 | Roskind | G06F 17/30902 709/219 |
| 2002/0062384 A1 | 5/2002 | Tso | |
| 2002/0147788 A1 * | 10/2002 | Nguyen | G06F 17/30902 709/217 |
| 2002/0152305 A1 | 10/2002 | Jackson et al. | |
| 2002/0194434 A1 | 12/2002 | Kurasugi | |
| 2003/0120658 A1 | 6/2003 | Carneal et al. | |
| 2003/0126232 A1 * | 7/2003 | Mogul | G06F 17/30902 709/219 |
| 2004/0073867 A1 | 4/2004 | Kausik et al. | |
| 2004/0088375 A1 * | 5/2004 | Sethi | G06F 17/30902 709/218 |
| 2004/0205149 A1 | 10/2004 | Dillon et al. | |
| 2004/0258053 A1 | 12/2004 | Toporek et al. | |
| 2005/0044242 A1 | 2/2005 | Stevens et al. | |
| 2005/0138143 A1 | 6/2005 | Thompson | |
| 2005/0198309 A1 | 9/2005 | Li et al. | |
| 2006/0206589 A1 | 9/2006 | Lentini et al. | |
| 2006/0294223 A1 | 12/2006 | Glasgow et al. | |
| 2007/0022102 A1 | 1/2007 | Saxena | |
| 2007/0250601 A1 | 10/2007 | Amlekar et al. | |
| 2008/0201332 A1 * | 8/2008 | Souders | G06F 17/30867 |
| 2008/0208789 A1 | 8/2008 | Almog | |
| 2008/0228772 A1 | 9/2008 | Plamondon | |
| 2008/0235239 A1 | 9/2008 | Penton et al. | |
| 2008/0301300 A1 | 12/2008 | Toub | |
| 2009/0282159 A1 | 11/2009 | Wang et al. | |
| 2010/0262683 A1 | 10/2010 | Gerber et al. | |
| 2010/0281224 A1 | 11/2010 | Ho et al. | |
| 2010/0312858 A1 * | 12/2010 | Mickens | G06F 17/30902 709/219 |
| 2010/0332586 A1 | 12/2010 | Jogand-Coulomb et al. | |
| 2011/0131341 A1 | 6/2011 | Yoo et al. | |
| 2011/0185017 A1 | 7/2011 | Rezaiifar | |
| 2012/0029670 A1 | 2/2012 | Mont-Reynaud et al. | |
| 2012/0084516 A1 * | 4/2012 | Iwuchukwu | H04L 67/2847 711/144 |
| 2012/0233199 A1 | 9/2012 | Jenkins | |
| 2013/0097309 A1 * | 4/2013 | Ma | H04L 29/08099 709/224 |
| 2013/0159383 A1 | 6/2013 | Tuliani et al. | |

FOREIGN PATENT DOCUMENTS

| | | |
|---|---|---|
| EP | 2120014 A1 | 11/2009 |
| JP | 2003114824 A | 4/2003 |
| RU | 2000112850 A | 6/2002 |

OTHER PUBLICATIONS

Office Action received for Chinese Patent Application No. 201210546718.1, dated Nov. 3, 2014, 7 pages.
Second Office Action Issued in Chinese Patent Application No. 201210546718.1, dated Jun. 23, 2015, 6 Pages.
Supplementary European Search Report Issued in Application No. 12857917.4, dated Jul. 10, 2015, 6 Pages.
Komninos, et al., "A calendar based Internet content pre-caching agent for small computing devices", Retrieved at <<http://citeseerx.ist.psu.edu/viewdoc/download?doi=10.1.1.66.4946&rep=rep1&type=pdf>>, Personal and Ubiquitous Computing, vol. 12, No. 7, Oct. 2008, pp. 15.
Pallis, et al., "Insight and Perspectives for Content Delivery Networks", Retrieved at <<http://citeseerx.ist.psu.edu/viewdoc/download?doi=10.1.1.74.4021&rep=rep1&type=pdf>>, Communications of the ACM, vol. 49, No. 1, Jan. 2006, pp. 101-106.
Chen, et al., "Segment-Based Proxy Caching for Internet Streaming Media Delivery", Retrieved at <<http://ieeexplore.ieee.org/stamp/stamp.jsp?tp=&arnumber=1490497>>, IEEE, Multimedia, vol. 12, No. 3, Jul.-Sep. 2005, pp. 2-9.
Zeng, et al., "Efficient Web Content Delivery Using Proxy Caching Techniques", Retrieved at <<http://ieeexplore.ieee.org/stamp/stamp.jsp?tp=&arnumber=1310442>>, IEEE Transactions on Systems, Man, and Cybernetics, Part C: Applications and Reviews, vol. 34, No. 3, Aug. 2004, pp. 270-280.
Krishnamurthy, et al., "On the Use and Performance of Content Distribution Networks", Retrieved at <<http://citeseerx.ist.psu.edu/viewdoc/download?doi=10.1.1.156.7203&rep=rep1&type=pdf>>, Proceedings of the 1st ACM SIGCOMM Workshop on Internet Measurement (IMW), Nov. 1-2, 2001, pp. 169-182.
"Notice of Allowance Issued in Chinese Patent Application No. 201210546718.1", dated Aug. 11, 2015, 4 Pages.
"Final Office Action Issued in U.S. Appl. No. 13/328,444", dated Oct. 25, 2013, 48 Pages.
"Final Office Action Issued in U.S. Appl. No. 13/328,444", dated Feb. 23, 2015, 26 Pages.
"Non Final Office Action Issued in U.S. Appl. No. 13/328,444", dated Jun. 12, 2015, 22 Pages.
"Non Final Office Action Issued in U.S. Appl. No. 13/328,444", dated Oct. 2, 2014, 24 Pages.
"Non Final Office Action Issued in U.S. Appl. No. 13/328,444", dated Jun. 26, 2013, 48 Pages.
"Notice of Allowance Issued in U.S. Appl. No. 13/328,444", dated Nov. 20, 2015, 10 Pages.
"Office Action Issued in Australian Patent Application No. 2012352651", dated May 26, 2017, 4 Pages.
"Notice of Allowance Issued in Russian Patent Application No. 2014124150", dated Jun. 22, 2017, 17 Pages.
"Office Action Issued in European Patent Application No. 12857917.4", dated Jul. 17, 2017, 8 Pages.
"Office Action Issued in Russian Patent Application No. 2014124150", dated Dec. 15, 2016, 5 Pages.
"Notice of Allowance Issued in Japanese Patent Application No. 2014-547304", dated Dec. 2, 2016, 3 Pages.

* cited by examiner

APPLICATION-DRIVEN CDN PRE-CACHING

CROSS-REFERENCE TO RELATED APPLICATIONS

This application is a continuation of U.S. application Ser. No. 13/328,444, filed Dec. 16, 2011, entitled "Application-Driven CDN Pre-Caching," now allowed, which is incorporated by reference in its entirety herein.

BACKGROUND

A content delivery network (CDN) is a network of computers containing copies of data placed at various network nodes. A CDN provides an interface for data between origin servers and end user computers. Origin servers are the primary sources of content, and servers of the CDN cache copies of the content having the highest demand. The servers of the CDN may be strategically arranged to be closer to the end user computers than the origin servers. The end user computers can access the high-demand data at the servers of the CDN rather than having to access the data directly from the origin servers. As such, a CDN improves access to the data by increasing access bandwidth, increasing redundancy, and reducing access latency.

Bing® Maps provided by Microsoft Corporation of Redmond, Wash., is an example of an online application that provides content using a CDN. This application has a large amount of static content in the form of map tiles (images of portions of a map) stored in origin servers that is delivered to end-users via the CDN. For instance, a user may use a web browser to browse a map at their computing device, such as by panning across the map, zooming in or out of a portion of the map, etc. As the user browses the map, the browser transmits requests for new map tiles to the CDN.

Various techniques have been developed to enable content (e.g., map tiles) to be more rapidly provided to a web browser at the user computing device. According to a first technique, an origin server for an online application may predict future content requests. The predicted future content may be pre-cached in the CDN so that it can be accessed more quickly by the user computing device if the predicted future content is actually requested. According to a second technique, a client web browser at a user computing device may predict what content may be desired in the future, and may pre-fetch the content to the web browser. According to a third technique, a CDN server may predict future content requests by a user computing device, and may pre-cache the predicted future content in the CDN.

However, these techniques have disadvantages. For instance, having the origin servers predict future content has a disadvantage that the content to be pre-cached is determined in advance. With regard to pre-fetching content to a web browser, in cases where the user incurs a cost for data transfers or has limited bandwidth (such as in mobile applications), such pre-caching may not be acceptable and/or may not offer desirable performance. Furthermore, with regard to having the CDN predict and pre-cache future content, the CDN would have to be very sophisticated to understand the types of content requests that the CDN receives to be able to infer future content requests.

As such, current caching techniques are less than desirable. In the case of Bing® Maps, due to the number of map tiles that are available and the different focus areas of different users, the "cache hit" ratio (ratio of requested data that is cached versus the total amount of available data) is undesirably low (e.g., less than 50%). This results in relatively high latency in map loading, because instead of retrieving the map tiles from cache at the CDN, the map tiles frequently have to be retrieved from the origin servers for the users.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided for the caching of content prior to the content actually being requested. A client application may predict content that may be requested subsequently to desired content (rather than the prediction being made at the origin server or at a content delivery network server). Furthermore, the predicted content may be cached at a caching server of a content delivery network (rather than being cached at the web browser). Such techniques can increase cache hit ratios, reduce latency, and/or have further benefits.

In one method implementation in a caching server, a first request for desired content is received from a client application. The first request may also indicate additional content related to the desired content that may be subsequently requested by the client application. The indicated additional content is not currently indicated as desired for consumption, but is predicted to potentially be desired for consumption in the future. The desired content and the indicated additional content are retrieved from an origin server. The desired content is transmitted to the client application at a user device, and the additional content is cached at the caching server. Subsequently, a second request may be received from the client application that includes a request for the additional content (e.g., because the additional content is now desired for consumption at the client application). The additional content, which is cached at the caching server in response to the first request, is served to the client application by the caching server in response to the second request.

The first request for desired content may include a likelihood indication that indicates a likelihood that the additional content may be subsequently requested by the client application. A request for the indicated additional content at the origin server may be prioritized based on the likelihood indication (relative to other content requests) and/or other information.

In one system implementation, a caching server may include a content request parser, a content retriever module, and a content provider module. The content request parser receives a request for desired content from a client application in a user device. The request indicates additional content related to the desired content that may be subsequently requested by the client application. The content retriever module transmits at least one request for the desired content and the indicated additional content to an origin server, receives the desired content and the additional content from the origin server, and caches the additional content in storage. The content provider module transmits the desired content to the client application at the user device. The content request parser receives a second request from the client application that includes a request for the additional content. The content provider module serves the cached additional content to the client application in response to the second request.

Furthermore, the content retriever module may include a request prioritizer that prioritizes transmitting a request for the indicated additional content to the origin server based on a likelihood indication.

In one client application implementation, the client application may include a communication interface and an additional content predictor. The additional content predictor receives an indication of currently desired content for the client application, and predicts additional content that may be subsequently requested by the client application. The communication interface generates a first request for the desired content that also indicates the predicted additional content. The communication interface receives the desired content from a caching server that retrieved the desired content from an origin server in response to the first request. Subsequently, the communication interface generates a second request, which is a request for the predicted additional content as currently desired content. The predicted additional content is received from the caching server. The caching server had previously retrieved the additional content from an origin server and had cached the additional content in response to the first request.

Furthermore, the additional content predictor may include an additional content prioritizer. The additional content prioritizer generates a likelihood indication that indicates a likelihood that the additional content may be subsequently requested by the client application.

Computer program products are also described herein for client applications that predict future content requests, for caching servers that cache predicted future content, as well as further additional embodiments.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
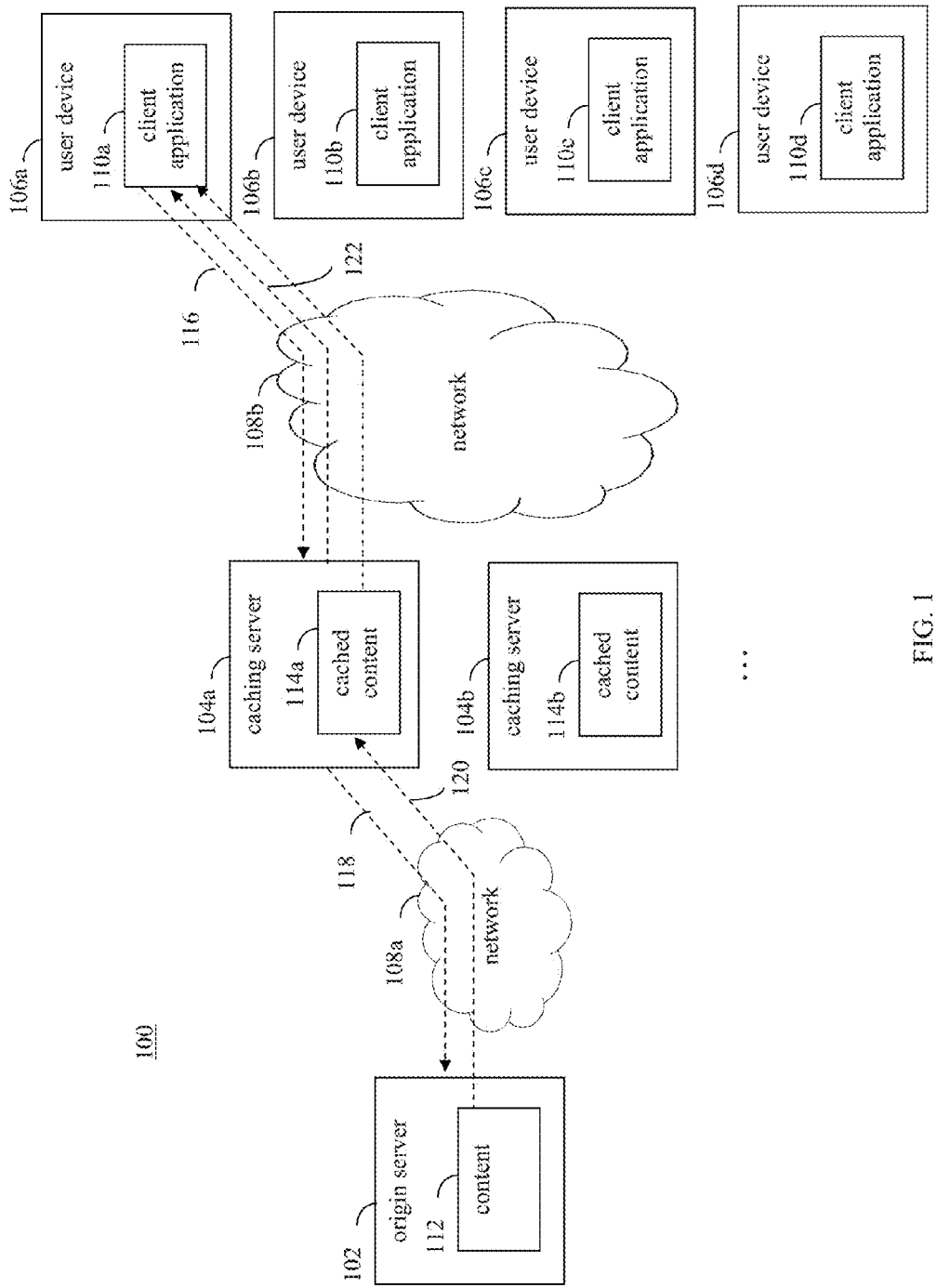
FIG. 1 shows a block diagram of a content delivery network that delivers content to user devices, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments of the present invention are described as follows. It noted that any section/subsection headings provided herein are not intended to be limiting. Embodiments are described throughout this document, and any type of embodiment may be included under any section/subsection.

II. Example Embodiments

A content delivery network (CDN) is a network of computers containing copies of data placed at various network nodes. A CDN provides an interface for data between origin servers and end user computers. Origin servers are the primary sources of content, and servers of the CDN cache copies of the content of the origin servers having the highest demand. The servers of the CDN may be strategically arranged to be closer to the end user computers than the origin servers. The end user computers can access the high-demand data at the servers of the CDN rather than having to access the data directly from the origin servers. As such, a CDN improves access to the data by increasing access bandwidth, increasing redundancy, and reducing access latency. Types of content that may be cached in CDNs include web objects (text, graphics, URLs and scripts), downloadable objects (media files, software, documents), applications, live streaming media, and database queries.

Various techniques have been developed to enable content (e.g., map tiles) to be more rapidly provided to a web browser at the user computing device. According to a first technique, an origin server for an online application may predict future content requests. The predicted future content may be pre-cached in the CDN so that it can be accessed more quickly by the user computing device if the predicted future content is actually requested. According to a second technique, a client web browser may predict what content may be desired in the future, and may pre-fetch the content to the web browser at the user computing device (e.g., using AJAX (asynchronous JavaScript) techniques). For instance, a user may use a web browser to view a series of images at a computing device. Each time an image is viewed, a next image to be viewed may be predicted at the origin server, and the predicted next image may be pre-fetched to the web browser to enable a smooth and instant transition from a current image to a next image. According to a third technique, a CDN server may predict future content requests by a user computing device, and may pre-cache the predicted future content in the CDN.

However, these techniques have disadvantages. For instance, having the origin servers predict future content has a disadvantage that the content to be pre-cached is determined in advance. With regard to pre-fetching content to a web browser, in cases where the user incurs a cost for data transfers or has limited bandwidth (such as in mobile applications), such pre-caching may not be acceptable and/or may not offer desirable performance. Furthermore, with regard to having the CDN predict and pre-cache future content, the CDN would have to be very sophisticated to understand the types of content requests that the CDN receives to be able to infer future content requests.

Embodiments of the present invention overcome such disadvantages. In an embodiment, logic for predicting content that may be desired in the future may be implemented in a client application at the user computing device (e.g., in a web browser or other client application). As such, the logic may be tailored more specifically to the client application, and may evolve (e.g., through updates) as the client application evolves.

Furthermore, in an embodiment, the predicted future content may be cached in storage in the CDN, rather than being pre-cached at the web browser. Pre-caching to storage in the CDN does not significantly increase data transferred to the web browser, and thus does not adversely affect web browser performance, and does not have issues where data transfers have cost or where limited bandwidth is present.

As such, embodiments enable pre-caching of content in caching servers of a CDN rather than at the client applications themselves. Business logic is enabled to reside within the client application that decides what content is to be pre-cached. The client application can hint to a CDN as to what content to pre-cache directly based on user context/ behavior and/or other factors. The pre-caching hint can optionally include an indication of a likelihood that the content will be used in the future, allowing the CDN to prioritize pre-caching requests according to available capacity.

Embodiments may be implemented in any type of CDN. For instance, FIG. 1 shows a block diagram of a CDN 100 that delivers content to user devices, according to an example embodiment. CDN 100 is shown as an example type of content delivery network, and is not intended to be limiting. As shown in FIG. 1, CDN 100 includes an origin server 102 and first and second caching servers 104a and 104b. Furthermore, as shown in FIG. 1, CDN 100 delivers content to first-fourth user devices 106a-106d. Although a single origin server 102, two caching servers 104a and 104b, and four user devices 106a-106d are shown in FIG. 1 for illustrative purposes, any numbers of these features of FIG. 1 may be present, including one or more additional origin servers, one or more additional caching servers, and/or one or more additional user devices, including tens, hundreds, thousands, and even greater numbers of servers and/or user devices. In an embodiment, caching servers 104a and 104b may or may not be included in a caching server cluster (as well as optionally further caching servers), and any number of caching server clusters may be present.

User devices 106a-106d may each be any type of stationary or mobile computing device, including a desktop computer (e.g., a personal computer, etc.), a mobile computer or computing device (e.g., a Palm® device, a RIM Blackberry® device, a personal digital assistant (PDA), a laptop computer, a notebook computer, a tablet computer (e.g., an Apple iPad™), a netbook, etc.), a smart phone (e.g., an Apple iPhone, a Google Android™ phone, a Microsoft Windows® phone, etc.), or other type of computing device.

As shown in FIG. 1, origin server 102 and caching servers 104a and 104b are communicatively coupled through a network 108a, and caching servers 104a and 104b and user devices 106a-106d are communicatively coupled through a network 108b. Networks 108a and 108b may be separate networks or may be included in a single network. Examples of networks 108a and 108b include a LAN (local area network), a WAN (wide area network), or a combination of networks, such as the Internet. Examples of communication links that may be included in networks 108a and 108b include IEEE 802.11 wireless LAN (WLAN) wireless links, Worldwide Interoperability for Microwave Access (Wi-MAX) links, cellular network links, wireless personal area network (PAN) links (e.g., Bluetooth™ links), Ethernet links, USB (universal serial bus) links, etc. Origin server 102 and caching servers 104a and 104b may each be any type of computing device described herein or otherwise known.

As shown in FIG. 1, each of user devices 106a-106d includes a corresponding one of client applications 110a-110d. Client applications 110a-110d are applications running in user devices 106a-106d that access content through CDN 100. Examples of client applications 110a-110d include web browsers, media players (e.g., video players, image viewers, audio players, etc.), and other types of client applications. As shown in FIG. 1 origin server 102 stores content 112 in storage that may be desired to be accessed by client applications 110a-110d. Content 112 may be any type of content, including web objects (e.g., text, graphics/images/videos, URLs, (uniform resource locators), scripts, etc.), downloadable objects (e.g., media files, software, documents, etc.), applications, live streaming media, and database data. Client applications 110a-110d may access content 112 directly at origin server 102 in some cases.

Furthermore, caching servers 104a-104b may each cache portions of content 112 as cached content 114a and cached content 114b, respectively. As such, client applications 110a-110d may access content 112 at caching servers 104a and 104b as cached content 114a and 114b in some cases, rather than having to obtain content 112 directly from origin server 102, which may be a bottleneck.

For instance, as shown in FIG. 1, client application 110a of user device 106a may transmit a content request 116 to caching server 104a. Content request 116 indicates content predicted to be requested in the future by client application 110a and content immediately desired by client application 110a. In this manner, client application 110a communicates to caching server 104a content that may requested in the future, and therefore that may be desirable to be cached by caching server 104a. Note that in the embodiment of FIG. 1, content request 116 indicates both the content desired by client application 110a and the content predicted to be requested in the future by client application 110a. In another embodiment, content request 116 may indicate the content predicted to be requested in the future by client application 110a, and the content desired by client application 110a may be indicated in a separate request transmitted from client application 110a to caching server 104a.

Caching server 104a may generate a content request 118 that is transmitted to origin server 102, requesting the predicted future content indicated in content request 116. If the desired content requested by client application 110a is not already cached at caching server 104a, caching server 104a may indicate the desired content in content request 118, or may transmit a separate request to origin server 102 (or other origin server) for the desired content. Origin server 102 may transmit content of content 112 to caching server 104a in a response 120 to content request 118. Response 120 may include the desired content and the predicted future content. Alternatively, the desired content and predicted future content may be transmitted from origin server 102 to caching server 104a in separate transmissions, or the desired content and predicted future content may be transmitted from different origin servers. Caching server 104a may cache the desired content and the predicted future content as cached content 114a, and may transmit the desired content to client application 110a as desired content 122. If client application 110a does subsequently request content from caching server 104a that was the predicted future content, caching server 104a may transmit cached content 114a to client application 110a, which includes the predicted future content. Client applications 110b-110d may similarly interact with either or both of caching servers 104a and 104b to receive content of original server 102 in a more efficient manner than in conventional techniques, due to the caching of predicted future content at caching server 104a and 104b.

Figure 2:
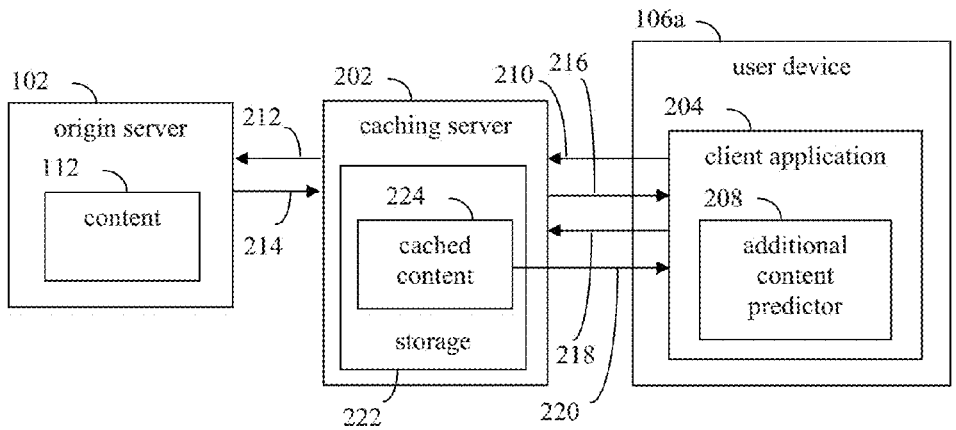
FIG. 2 shows a block diagram of a content delivery network where predicted content is retrieved and cached by a caching server, according to an example embodiment.

As described above, in an embodiment, client applications may predict content to be accessed in the future, and the predicted content may be cached at caching servers for faster response. In an embodiment, client applications 110a-110d of FIG. 1 may predict content to be accessed in the future, and may indicate the predicted future content to caching servers 104a and 104b to be cached. For instance, FIG. 2 shows a block diagram of a CDN 200, according to an example embodiment. As shown in FIG. 2, CDN 200 includes origin server 102, a caching server 202, and user device 106a. Caching server 202 is an example of one or caching servers 104a and 104b of FIG. 1. As shown in FIG. 2, user device 106a includes a client application 204, and client application 204 includes an additional content predictor 208. Client application 204 is an example of one of client applications 110a-110d of FIG. 1. In FIG. 2, client application 204 is configured to predict content that may be subsequently requested, and the predicted content is retrieved and cached by caching server 202.

Figure 3:
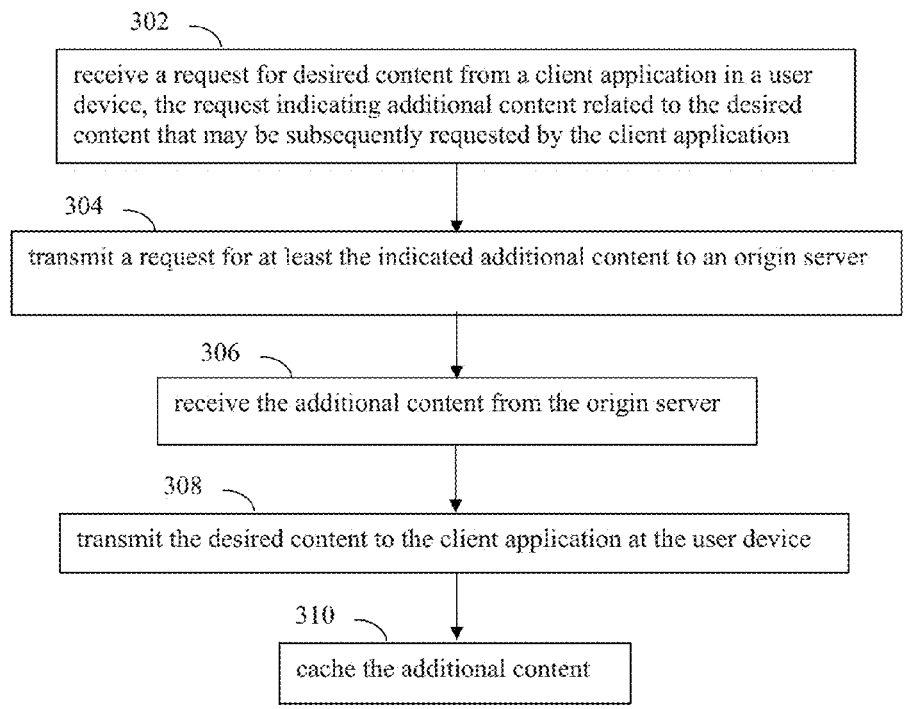
FIG. 3 shows a flowchart providing a process for a caching server to cache content that may be requested in the future by a client application, according to an example embodiment.

FIG. 2 is described as follows with respect to FIG. 3. FIG. 3 shows a flowchart 300 providing a process for a caching server to cache content that may be requested in the future by a client application, according to an example embodiment. In an embodiment, flowchart 300 may be performed by caching server 202 of FIG. 2. In one embodiment, flowchart 300 may be performed jointly by multiple caching servers that share cache storage. Furthermore, communications in flowchart 300 with regard to an origin server may be performed with a single origin server or multiple origin servers. Further structural and operational embodiments will be apparent to persons skilled in the relevant art(s) based on the following discussion regarding flowchart 300 and caching server 202.

Flowchart 300 begins with step 302. In step 302, a request for desired content is received from a client application in a user device, the request indicating additional content related to the desired content that may be subsequently requested by the client application. For example, as shown in FIG. 2, caching server 202 may receive a first desired content request 210 from client application 204 of user device 106a. First desired content request 210 is a request for desired content such as a map tile of a map being viewed by a user using client application 204, an image in a series of images being viewed by a user using client application 204, a video frame of a video object (e.g., a video file) being viewed by a user using client application 204, an audio frame of an audio object (e.g., an audio file) being played by a user using client application 204, a content item of a web page to be viewed by a user using client application 204, and/or other content described elsewhere herein or otherwise known.

Furthermore, first desired content request 210 includes an indication of additional content related to the desired content that may be subsequently requested by client application 204. In an embodiment, additional content predictor 208 of client application 204 predicts additional content related to the desired content that may be subsequently requested by client application 204. For instance, the predicted additional content may be one or more additional map tiles of the map being viewed by the user that is/are predicted to be subsequently viewed by the user, one or more additional images in the series of images being viewed by the user that is/are predicted to be subsequently viewed by the user, one or more additional video frames of the video object being viewed by the user that is/are predicted to be subsequently viewed by the user, one or more additional audio frames of the audio object being played by the user that is/are predicted to be subsequently played, one or more additional content items referenced by a web page that are predicted to be subsequently viewed, etc. An indication of the predicted additional content is included in first desired content request 210 by client application 204.

Note that first desired content request 210 (and response(s) thereto) may be included in one or more communication connections (e.g., a TCP connection) between client application 204 and caching sever 202. Any number of connections may be formed between client application 204 and caching sever 202, and each connection may include a request for desired content and/or may indicate one or more predicted additional content items. In some cases, the desired content may already be cached at caching server 202, while the predicted future content is not already cached. In such case, only the predicted future content may be requested by caching server 202 from the origin server (i.e., the desired content, which is already cached at caching server 202, need not be requested from the origin server).

Referring back to FIG. 3, in step 304, a request for at least the indicated additional content is transmitted to an origin server. For example, as shown in FIG. 2, caching server 202 may transmit a server request 212 that indicates the additional content indicated in first desired content request 210. Server request 212 is received by origin server 102. Caching server 202 may optionally transmit a request to origin server 102 for the desired content indicated in first desired content request 210 if the desired content is not already cached by caching server 202. In an embodiment, server request 212 may include both a request for the predicted additional content and a request for the desired content.

In step 306, the additional content is received from the origin server. For instance, in response to server request 212, origin server 102 may transmit a server response 214 that includes the desired content, if requested. For instance, origin server 102 may access the desired content in storage associated with origin server 102. Caching server 202 receives server response 214 from origin server 102. Furthermore, origin server 102 may access the predicted additional content in storage associated with origin server 102, and may transmit the predicted additional content to caching server 202 in server response 214 or in a separate response.

In step 308, the desired content is transmitted to the client application at the user device. For instance, as shown in FIG. 2, caching server 202 may transmit the requested desired content to client application 204 in a first desired content response 216.

In step 310, the additional content is cached. For example, as shown in FIG. 2, caching server 202 may include storage 222, and the predicted additional content received from origin server 102 in server response 214 may be cached in storage 222 as cached content 224. Storage 222 may include one or more of any type of storage mechanism to cache content, including a magnetic disk (e.g., in a hard disk drive), an optical disc (e.g., in an optical disk drive), a magnetic tape (e.g., in a tape drive), a memory device such as a RAM (random access memory) device, etc., and/or any other suitable type of storage medium. Furthermore, storage 222 may be shared among multiple caching servers, in an embodiment.

According to flowchart 300, a client application has informed the CDN of a prediction of additional content that may be desired in the future, and the predicted additional content is pre-cached in the CDN (e.g., in caching server 402 of the CDN). This pre-caching increases the cache-hit ratio for content that is actually subsequently requested, thereby improving the end-user experience overall. Note that all pre-cached content will not necessarily be used, and pre-cache requests may optionally be prioritized below normal CDN content requests. Example embodiments of such prioritizing are further described below. A benefit of pre-caching is to better leverage spare capacity, where it exists, to improve the overall user experience. The use of prioritization (e.g., likelihood indicators) aids in optimizing pre-caching.

Figure 4:
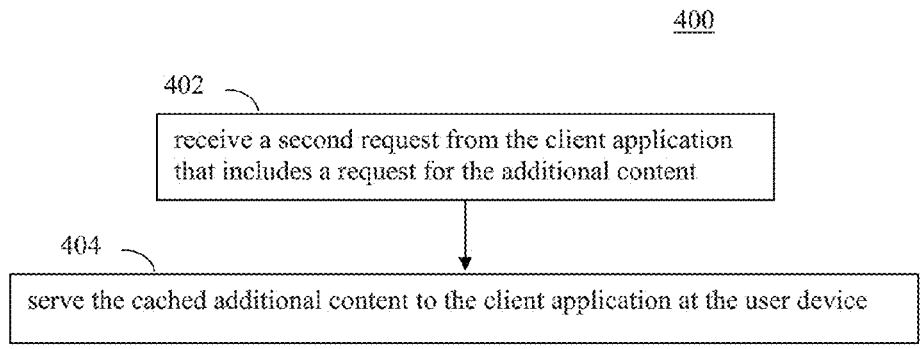
FIG. 4 shows a flowchart providing a process for providing previously cached content to a client application, according to an example embodiment.

For example, FIG. 4 shows a flowchart 400 providing a process for providing previously cached content to a client application, according to an example embodiment. For instance, in an embodiment, flowchart 400 may follow flowchart 300 of FIG. 3. Flowchart 400 is described as follows with respect to FIG. 2.

Flowchart 400 begins with step 402. In step 402, a second request is received from the client application that includes a request for the additional content. For instance, as shown in FIG. 2, caching server 202 may receive a second desired content request 218 from client application 204 of user device 106a. Second desired content request 218 is a request for content for client application 204 (e.g., map tiles, images, video, audio, web pages, etc.) that was previously predicted to potentially be requested by client application 204 in the future, and was indicated in first desired content request 210 (or other previous desired content request).

In step 404, the cached additional content is served to the client application at the user device. In an embodiment, caching server 202 may analyze second desired content request 218 to determine whether any content requested therein is already cached at caching server 202 (e.g., in storage 222). For instance, in an embodiment, caching server 202 may access a cached content map or other data structure that maps content identifiers (e.g., identification numbers, such as hash values, etc.) to content cached in storage 222. Caching server 202 may compare a content identifier received in second desired content request 218 for the desired content with the content identifiers in the cached content map to determine whether the desired content is already cached. If the content identifier for the desired content is found in the cached content map, the desired content is already cached at caching server 202. In such case, caching server 202 may access the cached content in storage 222 (e.g., as cached content 224), and may serve the cached content to client application 204 in a transmission of a cached content response 220.

In the event that the desired content indicated in second desired content request 218 is not already cached at caching server 202, caching server 202 may request the desired content from origin server 102 as described above with respect to steps 304 and 306 of flowchart 300 (FIG. 3). Furthermore, second desired content request 218 may optionally indicate further additional content predicted by additional content predictor 208 to potentially be subsequently desired, in a similar fashion to first desired content request 210. In such case, caching server 202 may request the indicated further additional content from origin server 102, and may cache the indicated further additional content in storage 222 for subsequent content requests, in a similar manner as described above with respect to steps 304, 306, and 310 of flowchart 300.

Example embodiments for client applications and caching servers are described in the following subsections.

A. Example Client Application Embodiments

Figure 5:
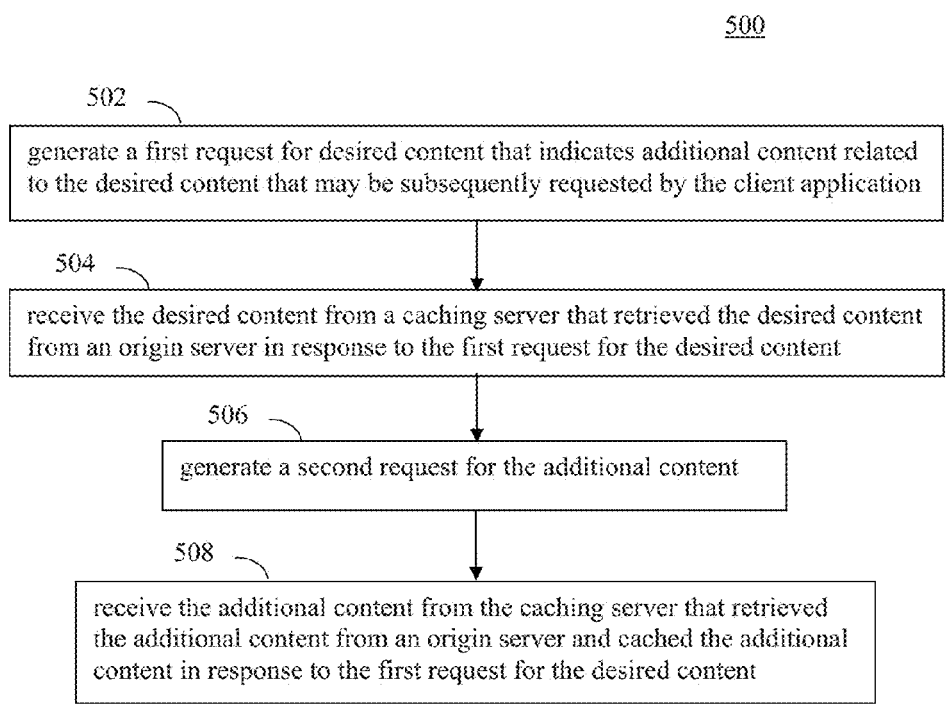
FIG. 5 shows a flowchart providing a process for a client application to request and receive desired content and to indicate content that may be requested in the future, according to an example embodiment.
Figure 6:
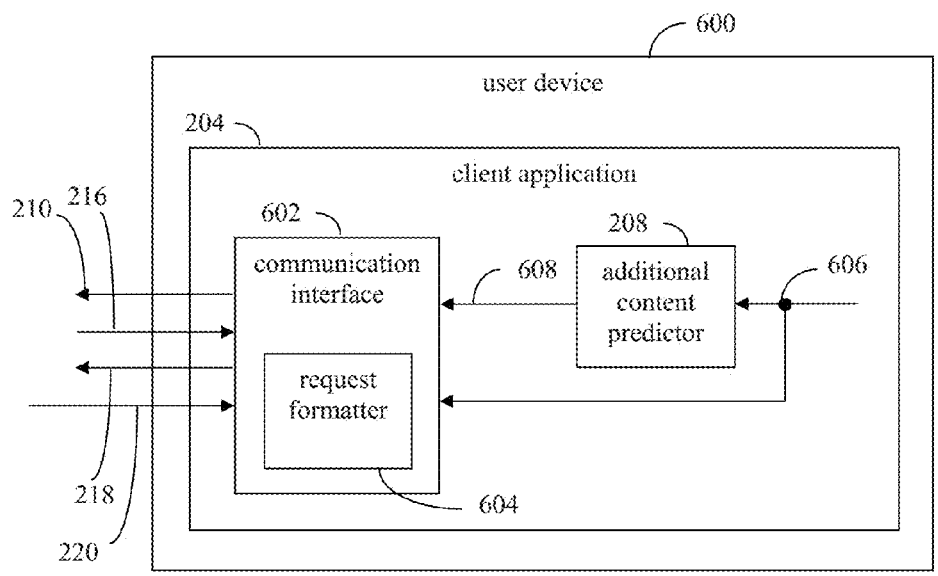
FIG. 6 shows a block diagram of a user device having a client application configured to request and receive desired content and to indicate content that may be requested in the future, according to an example embodiment.

As described above, in an embodiment, a client application (e.g., client application 204) may predict content to be accessed in the future, and the predicted content may be cached at caching servers for faster response. For instance, FIG. 5 shows a flowchart 500 providing a process for a client application to request and receive desired content and to indicate content that may be requested in the future for caching, according to an example embodiment. In an embodiment, flowchart 500 may be performed by client application 204 of FIG. 2. Flowchart 500 is described with respect to FIG. 6. FIG. 6 shows a block diagram of a user device 600 that includes an example embodiment of client application 204. As shown in FIG. 6, client application 204 includes a communication interface 602 and additional content predictor 208, and communication interface 602 includes a request formatter 604. Further structural and operational embodiments will be apparent to persons skilled in the relevant art(s) based on the following discussion regarding flowchart 500 and client application 204 of FIG. 6.

Flowchart 500 begins with step 502. In step 502, a first request for desired content is generated that indicates additional content related to the desired content that may be subsequently requested by the client application. For example, as shown in FIG. 6, client application 204 may generate first desired content request 210, which as described above, is a request for desired content. Furthermore, as described above, first desired content request 210 includes an indication of additional content related to the desired content that may be subsequently requested by client application 204.

In an embodiment, additional content predictor 208 of client application 204 predicts additional content related to the desired content that may be subsequently requested by client application 204. For instance, as shown in FIG. 6, additional content predictor 208 may receive desired content indication 606. Desired content indication 606 may be generated internally to client application 204 and/or may be input by a user to a user interface provided by client application 204. Desired content indication 606 indicates content desired to be displayed, played, or otherwise interacted with. For instance, desired content indication 606 may indicate one or more of a map tile, a video frame, an audio frame, an image, a web page, etc. (e.g., by URL, filename, etc.). Additional content predictor 208 may predict additional content based on the desired content indicated by desired content indication 606, and may output the predicted additional content as predicted additional content indication 608.

For instance, where desired content indication 606 indicates a map tile of a viewed map as desired content, additional content predictor 208 may predict one or more additional map tiles of the map to be subsequently viewed by the user. In such case, additional content predictor 208 may generate predicted additional content indication 608 to indicate one or more map tiles that are spatially adjacent to the indicated map tile, that are map tiles within the indicated map tile (zoomed in), that are map tiles that include the indicated map tile (zoomed out), and/or that are other map tiles of the map that are likely to be subsequently viewed by the user.

In another example, where desired content indication 606 indicates an image of a series of images as desired content, additional content predictor 208 may predict one or more additional images of the series of images to be subsequently viewed by the user, such as one or more subsequent images of the sequence of images (including the entire remainder of the sequence of images) that are adjacent (temporally or spatially) to the indicated image, an image that is a portion of the indicated image (e.g., a zoomed in image), an image that includes the entire indicated image (e.g., a zoomed out image), etc.

In another example, where desired content indication 606 indicates a video frame of a video as desired content, additional content predictor 208 may predict one or more additional video frames of the video to be subsequently viewed by the user, such as one or more subsequent video frames of the video (including the entire remainder of the video).

In still another example, where desired content indication 606 indicates an audio frame of an audio as desired content, additional content predictor 208 may predict one or more additional audio frames of the audio to be subsequently played by the user, such as one or more subsequent audio frames of the audio (including the entire remainder of the audio).

In still another example, where desired content indication 606 indicates a web page as desired content, additional content predictor 208 may predict one or more additional web pages or other web objects (e.g., images, videos, audio, etc.) to be subsequently viewed by the user, such as one or more web pages or other web objects linked within the indicated web page, one or more web pages of a website that includes the indicated web page, etc.

As shown in FIG. 6, communication interface 602 receives desired content indication 606 and predicted additional content indication 608. In an embodiment, request formatter 604 generates one or more requests to request the desired content indicated by desired content indication 606 and the predicted additional content indicated by predicted additional content indication 608. Communication interface 602 is configured to transmit the request(s) generated by request formatter 604 from client application 204 as first desired content request 210. In embodiments, request formatter 604 may generate the request(s) to have any format, as desired for a particular communication technique.

For instance, in one embodiment, request formatter 604 may generate the request in the form of an HTTP (hypertext transfer protocol) request message. In such an embodiment, the HTTP request message may be configured to request the desired content, and the predicted additional content may be indicated in the HTTP request message in any suitable manner, such as being indicated in a header. For instance, a portion of an example HTTP request message is shown below:

GET /images/logo.png HTTP/1.1
. . .
HINTS: <URL1>=20; <URL2>=60
. . .

In this example, the HTTP request message includes a request line that requests a web object "/images/logo.png" from a server as desired content. Furthermore, the example HTTP request message includes an HTTP header "HINTS" that indicates two URLs—URL1 and URL2—as predicted additional content. In this example, "URL1" and "URL2" may each be replaced in the "HINTS" header with full URLs to the corresponding predicted additional content (e.g., http://tv.msn.com/tv/article.aspx?news=xyz", etc.). Although two URLs are shown in the above example header, any number of items of predicted additional content may be indicated in a header in this manner by URL or other identifier.

Thus, in an embodiment, request formatter 604 may generate an HTTP request message that indicates desired content (e.g., using a "GET" instruction), and that indicates predicted additional content in a header (e.g., a "HINTS" or other predetermined type of header for predicted additional content). In other embodiments, desired content and predicted additional content may be indicated in other ways in a request by request formatter 604. Note that a single "HINTS" header may be present in an HTTP request message as shown in the above example, or multiple "HINTS" headers may be present. Still further, in an embodiment, an HTTP request message may indicate predicted additional content without indicating any desired content (i.e., only predicted additional content is specified/requested). In such an HTTP request message, a "GET" instruction may be used to specify the predicted additional content, and a "HINTS" or other header may not be used, or a header may be present (e.g., a "CACHEONLY" header) to indicate to the caching server that the requested content is to be cached but not yet returned to the client.

Communication interface 602 may transmit first desired content request 210 to a caching server. In embodiments, communication interface 602 may be configured to transmit first desired content request 210 in an HTTP message, and/or may be configured to communicate requests in other ways, as would be known to persons skilled in the relevant art(s).

Referring back to FIG. 5, in step 504, the desired content is received from a caching server that retrieved the desired content from an origin server in response to the first request for the desired content. For instance, as shown in FIG. 6, communication interface 602 may receive first desired content response 216 from a caching server in response to first desired content request 210. First desired content response 216 includes the desired content requested in request 210. Client application 204 may display, play, and/or otherwise enable a user at user device 600 to interact with the received desired content.

In step 506, a second request is generated for the additional content. For instance, as shown in FIG. 6, client application 204 may generate a second desired content request 218. As described above, second desired content request 218 is a request for content for client application 204 (e.g., map tiles, images, video, audio, web pages, etc.) that was previously predicted as possibly being subsequently requested by client application 204, and was indicated in first desired content request 210 as such. Second desired content request 218 may be generated in a similar manner as first desired content request 210. For instance, additional content predictor 208 may receive a second desired content indication 606, which indicates content desired to be displayed, played, or otherwise interacted with. Additional content predictor 208 may optionally predict additional content based on the desired content indicated by the second desired content indication 606, and may output the predicted additional content as second predicted additional content indication 608. Communication interface 602 receives the second desired content indication 606 and optionally receives the second predicted additional content indication 608. In an embodiment, request formatter 604 generates a request for the second desired content, and optionally includes the second predicted additional content in the generated request. Communication interface 602 is configured to transmit the request from client application 204 as second desired content request 218.

In step 508, the additional content is received from the caching server that retrieved the additional content from an origin server and cached the additional content in response to the first request for the desired content. For example, as shown in FIG. 6, communication interface 602 may receive cached content response 220, which includes cached content from a caching server as the desired content indicated in second desired content request 218. The caching server previously obtained the desired content from an origin server, and cached the desired content in the event that it may be subsequently requested.

As described above, requests for content for caching may optionally be prioritized below normal CDN content requests. In this manner, content that is actually being requested may be requested prior to content merely being requested for caching purposes. Also, content that is being requested for caching purposes that is more likely to actually be requested may be cached prior to content that is being requested for caching purposes that is less likely to actually be requested.

Figure 7:
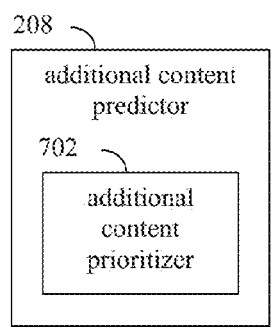
FIG. 7 shows a block diagram of an additional content predictor that includes an additional content prioritizer, according to an example embodiment.
Figure 8:
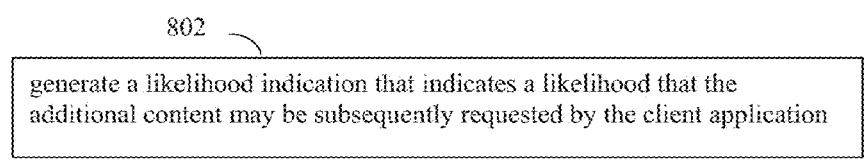
FIG. 8 shows a process for indicating a likelihood that content may be requested by a client application in the future, according to an example embodiment.

For instance, FIG. 7 shows a block diagram of additional content predictor 208 including an additional content prioritizer 702, according to an example embodiment. Additional content prioritizer 702 is configured to analyze predicted additional content to determine how likely it is to actually be subsequently requested by the client application. For instance, in an embodiment, additional content prioritizer 702 may operate according to a step 802 shown in FIG. 8. In step 802, a likelihood indication is generated that indicates a likelihood that the additional content may be subsequently requested by the client application. In an embodiment, for each predicted additional content item, additional content prioritizer 702 may generate a corresponding likelihood indication that indicates a likelihood that the additional content may be subsequently requested by client application 204. The generated likelihood indication may be associated with the corresponding predicted additional content item, and included in the desired content request transmitted to the caching server. The caching server may use the likelihood indication to prioritize the caching of the predicted additional content item relative to other content. Furthermore, the caching server may transmit the likelihood indication to the origin server when requesting the predicted content so that the origin server may prioritize providing of the predicted content to the caching server.

Additional content prioritizer 702 may generate likelihood indications in any manner, including based on the content being viewed and/or on user behavior. For instance, likelihood indications may be generated differently for different content types (e.g., assigning higher likelihood indication values to video frames relative to map tiles, etc.). In another embodiment, likelihood indications may be generated for predicted additional content differently by additional content prioritizer 702 based on the proximity (e.g., in time and/or in space) to the content that was actually requested. For instance, in a map example, map tiles that are immediately adjacent to a map tile being currently viewed may be assigned likelihood indications that are greater in value relative to map tiles that are separated from the viewed map tile by one or more intervening map tiles. Immediately next video frames of a video stream may be assigned likelihood indications having relatively high values relative to later video frames of the video stream (e.g., video frames that are later in time and positioning in the video stream). Images of an image stream and/or audio frames in an audio stream may be treated similarly and/or differently, depending on the actual implementation. In a web page, content items (e.g., URLs) that are located near the top of the web page may be assigned higher values of likelihood indications relative to content items that are located near the bottom of the web page. In embodiments, likelihood indications may be generated in various ways, and may have any suitable values and value ranges (e.g., numerical ranges, textual ranges (e.g., "high", "medium", "low", etc.)), as desired for particular implementations. With regard to user behavior, when a user is panning in a particular direction on a map, the likelihood of a map tile in that direction being requested in the future is higher than a likelihood of other tiles, and as such may be assigned greater likelihood indications. When a user fast forwards a video or audio, the "next" frame may be multiple frames forward, and as such, frames that are multiple frames forward in the stream may be assigned likelihood indications having relatively high values relative to more immediate frames.

For instance, in the example HTTP message shown above, a likelihood indication having a value of 20 may have been generated for URL1, and a likelihood indication having a value of 60 may have been generated for URL2. In such an example, likelihood indications may have values in the range of 1-100, with lower likelihood values meaning the corresponding predicted additional content item has a lower likelihood of actually being requested by the client application in the future, and higher likelihood values meaning the corresponding predicted additional content item has a greater likelihood of actually being requested by the client application in the future. As such, in this example, URL2 has a higher likelihood of being requested by the client application in the future relative to URL1, and therefore may be cached before URL1.

B. Example Caching Server Embodiments

Figure 9:
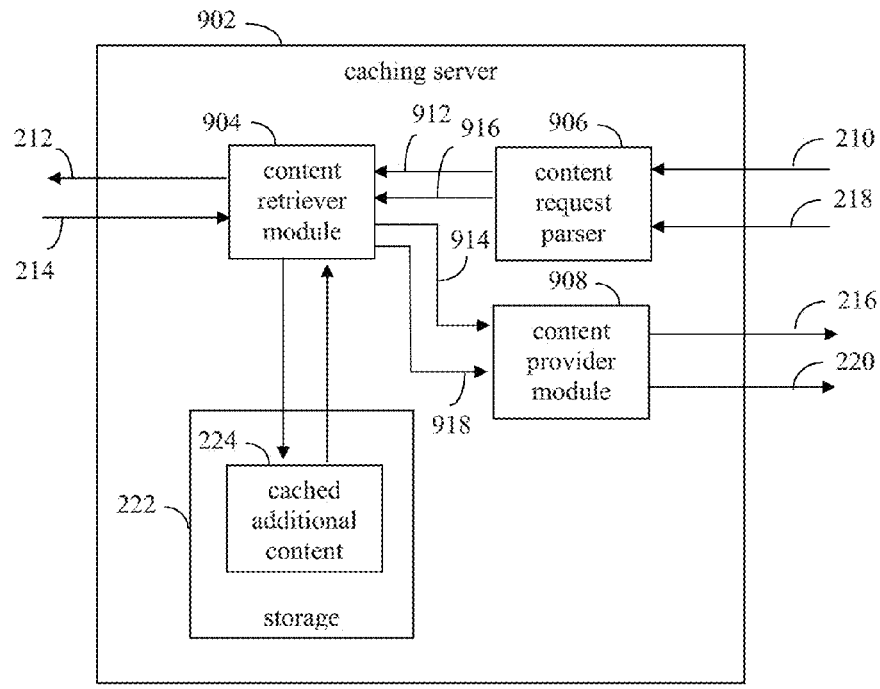
FIG. 9 shows a block diagram of a caching server, according to an example embodiment.

FIG. 9 shows a block diagram of a caching server 902, according to an example embodiment. Caching server 902 is an example of caching server 202 shown in FIG. 2. As shown in FIG. 2, caching server 902 includes a content retriever module 904, a content request parser 906, a content provider module 908, and storage 222. Caching server 902 may pre-cache predicted future content in various ways. For instance, caching server 902 may perform flowcharts 300 and 400, in embodiments.

For instance, content request parser 906 may perform step 302 of flowchart 300, where a request for desired content is received from a client application in a user device, the request indicating additional content related to the desired content that may be subsequently requested by the client application. Content request parser 906 may receive and parse first desired content request 210 to identify any desired content and any predicted additional content. Content request parser 906 transmits a first identified desired content and predicted additional content 912 to content retriever module 904.

Content retriever module 904 may perform step 304 of flowchart 300, where a request for the indicated additional content is transmitted to an origin server. As shown in FIG. 9, content retriever module 904 may transmit server request 212 to the origin server, which indicates the predicted additional content, and may indicate the desired content (if not already cached). Content retriever module 904 may include both of the request for the predicted additional content and the request for the desired content in server request 212, or may transmit them in separate communications.

Content retriever module 904 may perform step 306 of flowchart 300, where the desired content and the additional content are received from the origin server. Content retriever module 904 may receive server response 214 from the origin server that includes the desired content (if requested) and the predicted additional content, or may receive the desired content and predicted additional content in separate communications.

Content provider module 908 may perform step 308 of flowchart 300, where the desired content is transmitted to the client application at the user device. As shown in FIG. 9, content retriever module 904 may transmit retrieved desired content 914, which includes the desired content received from the original server in server response 214. Content provider module 908 may receive retrieved desired content 914, and may transmit the desired content to the client application in first desired content response 216.

Content retriever module 904 may perform step 310 of flowchart 300, where the additional content is cached. As shown in FIG. 9, content retriever module 904 may cache the predicted additional content in storage 222 as cached content 224.

Content request parser 906 may perform step 402 of flowchart 400 (FIG. 4), where a second request is received from the client application that includes a request for the additional content. As shown in FIG. 9, content request parser 906 may receive second desired content request 218 from a client application. Content request parser 906 may receive and parse second desired content request 218 to identify any desired content and any predicted additional content. Content request parser 906 transmits a second identified desired content and predicted additional content 916 to content retriever module 904. In the example of FIG. 9, second identified desired content and predicted additional content 916 includes the predicted additional content of first identified desired content and predicted additional content 912 as desired content.

Content retriever module 904 and content provider module 908 may perform step 404 of flowchart 400, where the cached additional content is served to the client application at the user device. Content retriever module 904 may analyze second identified desired content and predicted additional content 916 to determine whether any content requested therein is already cached in storage 222. For instance, in an embodiment, content retriever module 904 may access the cached content map or other data structure described above that maps content identifiers to content cached in storage 222. If content retriever module 904 determines that the desired content is already cached in storage 222, content retriever module 904 may access the cached content in storage 222 (e.g., as cached content 224), and may provide the cached content to content provider module 908 as cached content 918. Content provider module 908 may serve the cached content to the client application in cached content response 220.

In the event that the desired content indicated in second identified desired content and predicted additional content 916 is not already cached in storage 222, content retriever module 904 may request the desired content from the origin server as described above. Furthermore, second identified desired content and predicted additional content 916 may optionally indicate further additional content predicted to be subsequently requested. In such case, content retriever module 904 may request the indicated further additional content from the origin server, and may cache the indicated further additional content in storage 222 for subsequent content requests as described above.

Note that content retriever module 904, content request parser 906, and content provider module 908 may be configured to generate requests and receive responses according to any suitable communication protocols and formats, including HTTP messages, etc., as would be known to persons skilled in the relevant art(s).

Figure 10:
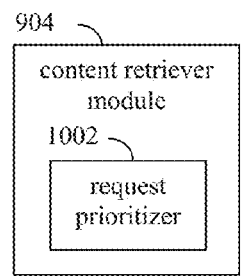
FIG. 10 shows a block diagram of a content retriever module that includes a request prioritizer, according to an example embodiment.
Figure 11:
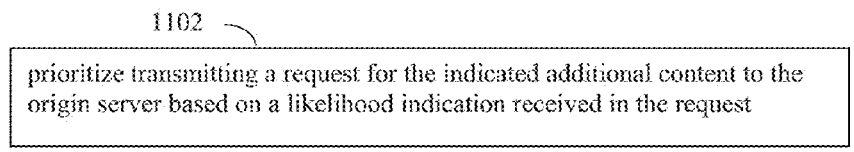
FIG. 11 shows a process for prioritizing requests to an origin server for content that may be requested by a client application in the future, according to an example embodiment.

Furthermore, as described above, requests for content for caching may optionally be prioritized relative to normal CDN content requests. For instance, FIG. 10 shows a block diagram of content retriever module 904 of FIG. 9 including a request prioritizer 1002, according to an example embodiment. Request prioritizer 1002 is configured to prioritize requests for content for caching. For instance, in an embodiment, request prioritizer 1002 may operate according to a step 1102 shown in FIG. 11. In step 1102, the transmitting of a request for the indicated additional content to the origin server is prioritized based on a likelihood indication received in the request. For instance, in an embodiment, for each predicted additional content item, request prioritizer 1002 may prioritize requesting the predicted additional content item relative to other content based on the corresponding likelihood indication received from client application 204.

For example, in an embodiment, request prioritizer 1002 may generate and maintain a priority list or other data structure that lists predicted additional content (e.g., by identifier) and the corresponding likelihood indications. Request prioritizer 1002 may order the list by the likelihood indications, or may otherwise structure the list, so that content retriever module 904 requests predicted additional content according to the likelihood indications in a prioritized manner. The predicted additional content and likelihood indications may be listed for a single client application or for multiple client applications. Thus, in this manner, content retriever module 904 may prioritize requests to an origin server for a single client application or for multiple client applications.

For instance, with respect to the example HTTP message shown above, request prioritizer 1002 may maintain (e.g., store and update as needed) a list of predicted additional content that includes URL1 and URL2, and their corresponding likelihood indications. Because URL2 has a likelihood indication value of 60, URL2 is prioritized higher than URL1, which has a likelihood indication value of 20. As such, in this example, content retriever module 904 retrieves the content of URL2 from an origin server before retrieving the content of URL1 from the origin server, according to the priority maintained by request prioritizer 1002.

Furthermore, in embodiments, content retriever module 904 may use additional and/or alternative information to prioritize requests for content, such as available storage capacity, available network capacity, available processing (e.g., CPU) capacity, etc. Still further, in an embodiment, the caching server may transmit the likelihood indication to the origin server when requesting the predicted future content so that the origin server may prioritize transmitting of the predicted content to the caching server relative to other content (e.g., prioritize a request for the predicted future content below requests for immediately desired content). As such, in an embodiment, an origin server may include a request prioritizer similar to request prioritizer 1002 that prioritizes the transmitting of predicted content to caching servers based on likelihood indications and/or on additional/alternative information.

III Example Computing Device Embodiments

Client applications 110a-110d, client application 204, additional content predictor 208, communication interface 602, request formatter 604, additional content prioritizer 702, content retriever module 904, content request parser 906, content provider module 908, request prioritizer 1002, flowchart 300, flowchart 400, flowchart 500, step 802, and step 1102 may be implemented in hardware, software, firmware, or any combination thereof. For example, client applications 110a-110d, client application 204, additional content predictor 208, communication interface 602, request formatter 604, additional content prioritizer 702, content retriever module 904, content request parser 906, content provider module 908, request prioritizer 1002, flowchart 300, flowchart 400, flowchart 500, step 802, and/or step 1102 may be implemented as computer program code/instructions/logic configured to be executed in one or more processors. Alternatively, client applications 110a-110d, client application 204, additional content predictor 208, communication interface 602, request formatter 604, additional content prioritizer 702, content retriever module 904, content request parser 906, content provider module 908, request prioritizer 1002, flowchart 300, flowchart 400, flowchart 500, step 802, and/or step 1102 may be implemented as hardware logic/electrical circuitry. For instance, in an embodiment, one or more of client applications 110a-110d, client application 204, additional content predictor 208, communication interface 602, request formatter 604, additional content prioritizer 702, content retriever module 904, content request parser 906, content provider module 908, request prioritizer 1002, flowchart 300, flowchart 400, flowchart 500, step 802, and/or step 1102 may be implemented together in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 12:
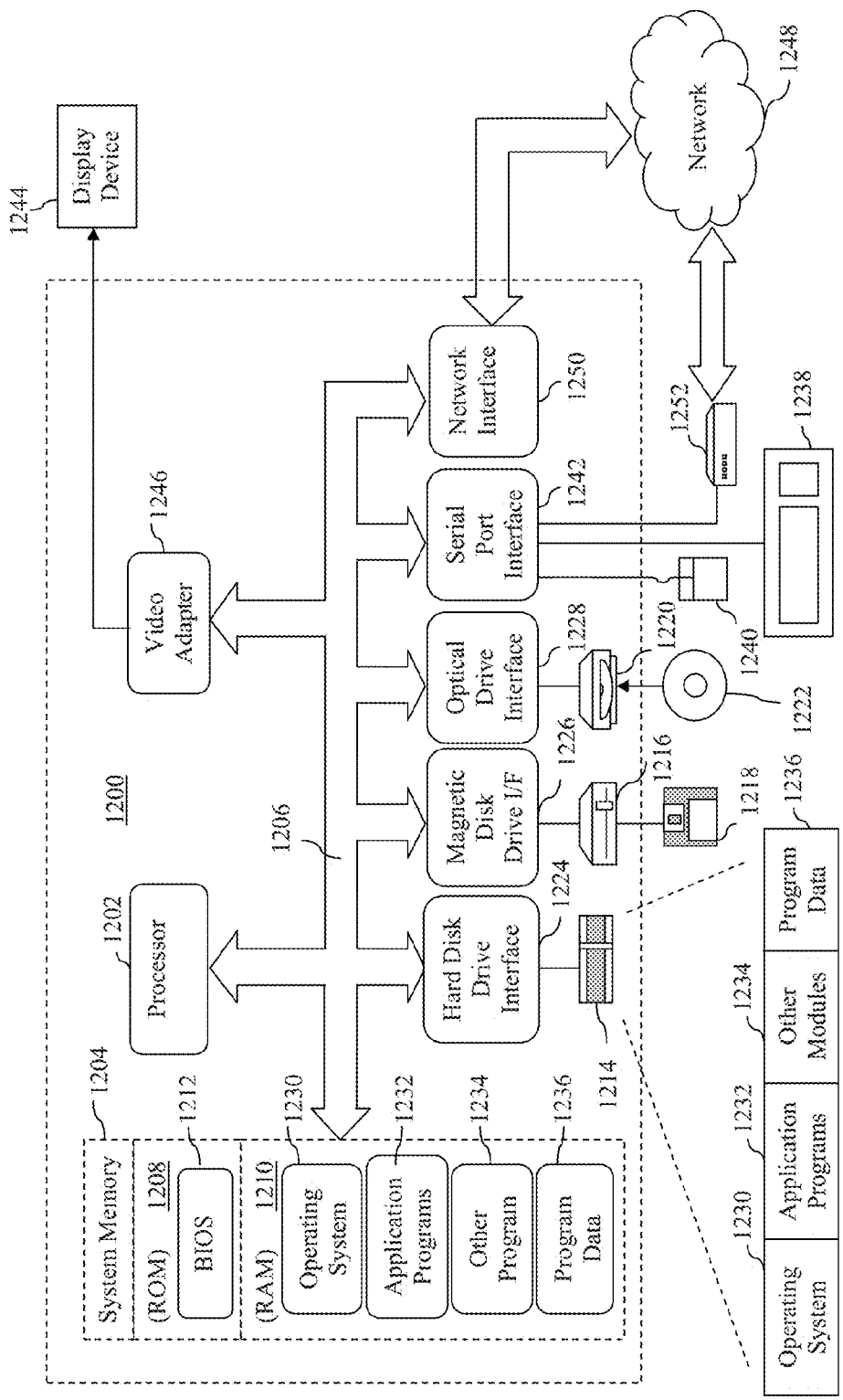
FIG. 12 shows a block diagram of an example computer that may be used to implement embodiments of the present invention.

FIG. 12 depicts an exemplary implementation of a computer 1200 in which embodiments of the present invention may be implemented. For example, each of origin server 102, caching servers 104a and 104b, user devices 106a-106d, caching server 202, user device 600, and caching server 902 may be implemented in one or more computer systems similar to computer 1200, including one or more features of computer 1200 and/or alternative features. Computer 1200 may be a general-purpose computing device in the form of a conventional personal computer, a mobile computer, a server, or a workstation, for example, or computer 1200 may be a special purpose computing device. The description of computer 1200 provided herein is provided for purposes of illustration, and is not intended to be limiting. Embodiments of the present invention may be implemented in further types of computer systems, as would be known to persons skilled in the relevant art(s).

As shown in FIG. 12, computer 1200 includes one or more processors 1202, a system memory 1204, and a bus 1206 that couples various system components including system memory 1204 to processor 1202. Bus 1206 represents one or more of any of several types of bus structures, including a memory bus or memory controller, a peripheral bus, an accelerated graphics port, and a processor or local bus using any of a variety of bus architectures. System memory 1204 includes read only memory (ROM) 1208 and random access memory (RAM) 1210. A basic input/output system 1212 (BIOS) is stored in ROM 1208.

Computer 1200 also has one or more of the following drives: a hard disk drive 1214 for reading from and writing to a hard disk, a magnetic disk drive 1216 for reading from or writing to a removable magnetic disk 1218, and an optical disk drive 1220 for reading from or writing to a removable optical disk 1222 such as a CD ROM, DVD ROM, or other optical media. Hard disk drive 1214, magnetic disk drive 1216, and optical disk drive 1220 are connected to bus 1206 by a hard disk drive interface 1224, a magnetic disk drive interface 1226, and an optical drive interface 1228, respectively. The drives and their associated computer-readable media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1230, one or more application programs 1232, other program modules 1234, and program data 1236. Application programs 1232 or program modules 1234 may include, for example, computer program logic (e.g., computer program code) for implementing client applications 110a-110d, client application 204, additional content predictor 208, communication interface 602, request formatter 604, additional content prioritizer 702, content retriever module 904, content request parser 906, content provider module 908, request prioritizer 1002, flowchart 300, flowchart 400, flowchart 500, step 802, and/or step 1102 (including any step of flowcharts 300, 400, and 500), and/or further embodiments described herein.

A user may enter commands and information into the computer 1200 through input devices such as keyboard 1238 and pointing device 1240. Other input devices (not shown) may include a microphone, joystick, game pad, satellite dish, scanner, or the like. These and other input devices are often connected to processor 1202 through a serial port interface 1242 that is coupled to bus 1206, but may be connected by other interfaces, such as a parallel port, game port, or a universal serial bus (USB).

A display device 1244 is also connected to bus 1206 via an interface, such as a video adapter 1246. In addition to the monitor, computer 1200 may include other peripheral output devices (not shown) such as speakers and printers.

Computer 1200 is connected to a network 1248 (e.g., the Internet) through an adaptor or network interface 1250, a modem 1252, or other means for establishing communications over the network. Modem 1252, which may be internal or external, may be connected to bus 1206 via serial port interface 1242, as shown in FIG. 12, or may be connected to bus 1206 using another interface type, including a parallel interface.

As used herein, the terms "computer program medium," "computer-readable medium," and "computer-readable storage medium" are used to generally refer to media such as the hard disk associated with hard disk drive 1214, removable magnetic disk 1218, removable optical disk 1222, as well as other media such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 1232 and other program modules 1234) may be stored on the hard disk, magnetic disk, optical disk, ROM, or RAM. Such computer programs may also be received via network interface 1250, serial port interface 1242, or any other interface type. Such computer programs, when executed or loaded by an application, enable computer 1200 to implement features of embodiments of the present invention discussed herein. Accordingly, such computer programs represent controllers of the computer 1200.

The invention is also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMs, nanotechnology-based storage devices, and the like.

Example Embodiments

In one embodiment, a method in a caching server comprises: receiving a request for desired content from a client application in a user device and an indication of additional content related to the desired content that may be subsequently requested by the client application; transmitting a request for at least the indicated additional content to an origin server; receiving the additional content from the origin server; transmitting the desired content to the client application at the user device; and caching the additional content.

In an embodiment, the method further comprises: receiving a second request from the client application that includes a request for the additional content; and serving the cached additional content to the client application at the user device.

In an embodiment, the second request indicates second additional content related to the first additional content that may be subsequently requested by the client application, the method further comprising: transmitting a request for the indicated second additional content to the origin server; receiving the second additional content from the origin server; and caching the second additional content.

In an embodiment, the indication of additional content includes a likelihood indication that indicates a likelihood that the additional content may be subsequently requested by the client application; wherein said transmitting a request for at least the indicated additional content to an origin server comprises: prioritizing transmitting a request for the indicated additional content to the origin server based on at least one of the likelihood indication, an available storage capacity, an available network capacity, or an available processing capacity.

In an embodiment, the request for desired content received from the client application is an HTTP (hypertext transfer protocol) message that indicates the additional content in a header.

In an embodiment, the desired content includes a first image and the additional content is a second image that is spatially adjacent to the first image, is adjacent to the first image in time, is a portion of the first image, or includes the first image.

In an embodiment, the request for desired content is received from the client application separately from the indication of additional content.

In another embodiment, a caching server comprises: a content request parser that receives a request for desired content from a client application in a user device and an indication of additional content related to the desired content that may be subsequently requested by the client application; a content retriever module that transmits a request for at least the indicated additional content to an origin server, receives the additional content from the origin server, and caches the additional content in storage; and a content provider module that transmits the desired content to the client application at the user device.

In an embodiment, the content request parser receives a second request from the client application that includes a request for the additional content, and the content provider module serves the cached additional content to the client application.

In an embodiment, the second request indicates second additional content related to the first additional content that may be subsequently requested by the client application; and the content retriever module transmits a request for the indicated second additional content to the origin server, receives the second additional content from the origin server, and caches the second additional content in the storage.

In an embodiment, the request for desired content further includes a likelihood indication that indicates a likelihood that the additional content may be subsequently requested by the client application; and the content retriever module prioritizes transmitting a request for the indicated additional content to the origin server based on the likelihood indication.

In an embodiment, the desired content includes a first content item in referenced by a web page and the additional content is a second content item referenced by the web page.

In an embodiment, the desired content includes a first video frame and the additional content is a second video frame that is subsequent to the first video frame in a video stream.

In another embodiment, computer readable storage medium has computer program instructions embodied in said computer readable storage medium for a client application, the computer program instructions comprising: first computer program instructions that enable a processor to generate a first request for desired content that indicates additional content related to the desired content that may be subsequently requested by the client application; second computer program instructions that enable a processor to receive the desired content from a caching server that retrieved the desired content from an origin server in response to the first request for the desired content; third computer program instructions that enable a processor to generate a second request for the additional content; and fourth computer program instructions that enable a processor to receive the additional content when received from the caching server that retrieved the additional content from an origin server and cached the additional content in response to the first request for the desired content.

In an embodiment, the second request indicates second additional content related to the first additional content that may be subsequently requested by the client application, the second additional content being retrieved from an origin server and cached by the caching server in response to the second request In an embodiment, the computer readable storage medium further comprises: fifth computer program instructions that enable a processor to generate a likelihood indication that indicates a likelihood that the additional content may be subsequently requested by the client application, the likelihood indication included in the first request for desired content.

In an embodiment, the first request for desired content is generated by the first computer program instructions as an HTTP (hypertext transfer protocol) message that indicates the additional content in a header.

In an embodiment, the desired content includes a first audio frame, the computer readable storage medium further comprising: fifth computer program instructions that determines the additional content to be a second audio frame subsequent to the first audio frame in an audio stream.

In an embodiment, the client application is a web browser.

In an embodiment, the client application is a media player or web application.

VI. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method in a client application executing in a computing device, comprising:
   generating a first request for desired content, the first request indicating additional content related to the desired content;
   generating a likelihood indication indicating a likelihood the additional content will be subsequently requested by the client application, the likelihood indication based at least upon a proximity of the additional content to the desired content and having a likelihood value in a likelihood range that ranges from a low likelihood value to a high likelihood value, with content of the additional content immediately following the desired content having the high likelihood value;
   transmitting the first request and the generated likelihood indication to a caching server;
   receiving the desired content, but not the additional content, from the caching server, the caching server having retrieved the desired content from an origin server in response to the first request and having retrieved the additional content from the origin server based on the likelihood indication, the caching server having cached the retrieved additional content;
   transmitting a second request to the caching server, the second request being a request for the additional content; and
   receiving the cached additional content from the caching server in response to the second request.

2. The method of claim 1, wherein the desired content includes a first map tile and the additional content includes a second map tile, and said generating the likelihood indication based at least upon a proximity of the additional content to the desired content comprises:
   generating the likelihood indication based on a proximity of the second map tile to the first map tile in a map.

3. The method of claim 1, wherein generating the likelihood indication comprises:
   generating the likelihood indication based at least upon a behavior of a user of the client application with respect to the desired content.

4. The method of claim 3, wherein the desired content includes a first content item and the additional content includes a second content item, and said generating the likelihood indication based at least upon a behavior of a user of the client application with respect to the desired content comprises:
   generating the likelihood indication based on whether the user of the computing device pans in a direction of the second content item.

5. The method of claim 1, wherein generating the likelihood indication comprises:
   generating the likelihood indication based at least upon a type of content of at least one of the desired content or the additional content.

6. The method of claim 5, wherein generating the likelihood indication based at least upon the type of content of at least one of the desired content or the additional content comprises:
generating the high likelihood value for a video frame in a video stream that immediately follows an additional video frame viewed using the client application.

7. The method of claim 5, wherein generating the likelihood indication based at least upon the type of content of at least one of the desired content or the additional content comprises:
generating the high likelihood value for an audio frame in an audio object that immediately follows an additional audio frame played using the client application.

8. A computing device, comprising:
at least one processor;
at least one memory storing program code defining a client application configured to be executed by the at least one processor, the program code comprising:
a request formatter configured to generate a first request for desired content, and an additional content predictor configured to predict additional content related to the desired content, the request formatter configured to indicate the additional content in the first request, the additional content predictor including an additional content prioritizer configured to generate a likelihood indication indicating a likelihood the additional content will be subsequently requested by the client application, the likelihood indication based at least upon a proximity of the additional content to the desired content and having a likelihood value in a likelihood range that ranges from a low likelihood value to a high likelihood value, content of the additional content temporally adjacent to the desired content having the high likelihood value; and
a communication interface configured to transmit the first request and the generated likelihood indication to a caching server, and receive the desired content, but not the additional content, from the caching server, the caching server having retrieved the desired content from an origin server in response to the first request and having retrieved the additional content from the origin server based on the likelihood indication, the caching server having cached the retrieved additional content;
the request formatter configured to generate a second request, the second request requesting the additional content; and
the communication interface configured to transmit the second request to the caching server, and receive the cached additional content from the caching server in response to the second request.

9. The computing device of claim 8, wherein the desired content includes a first map tile and the additional content includes a second map tile, and the additional content prioritizer is configured to generate the likelihood indication based on a proximity of the second map tile to the first map tile in a map.

10. The computing device of claim 8, wherein the additional content prioritizer is configured to generate the likelihood indication based at least upon a behavior of a user of the client application with respect to the desired content.

11. The computing device of claim 10, wherein the desired content includes a first content item and the additional content includes a second content item, and the additional content prioritizer is configured to generate the likelihood indication based on whether the user of the computing device pans in a direction of the second content item.

12. The computing device of claim 8, wherein the additional content prioritizer is configured to generate the likelihood indication based at least upon a type of content of at least one of the desired content or the additional content.

13. The computing device of claim 8, wherein the additional content prioritizer is configured to generate the high likelihood value for a video frame in a video stream that immediately follows an additional video frame viewed using the client application.

14. The computing device of claim 8, wherein the additional content prioritizer is configured to generate the high likelihood value for an audio frame in an audio object that immediately follows an additional audio frame played using the client application.

15. A computing device, comprising:
at least one processor; and
program code defining a client application configured to be executed by the at least one processor to perform a method including:
generating a first request for desired content, the first request indicating additional content related to the desired content;
generating a likelihood indication indicating a likelihood the additional content will be subsequently requested by the client application, the likelihood indication based at least upon a proximity of the additional content to the desired content and having a likelihood value in a likelihood range that ranges from a low likelihood value to a high likelihood value, content of the additional content spatially adjacent to the desired content having the high likelihood value;
transmitting the first request and the generated likelihood indication to a caching server;
receiving the desired content, but not the additional content, from the caching server, the caching server having retrieved the desired content from an origin server in response to the first request and having retrieved the additional content from the origin server based on the likelihood indication, the caching server having cached the retrieved additional content;
transmitting a second request to the caching server, the second request being a request for the additional content; and
receiving the cached additional content from the caching server in response to the second request.

16. The computing device of claim 15, wherein the desired content includes a first map tile and the additional content includes a second map tile, and said generating the likelihood indication based at least upon a proximity of the additional content to the desired content comprises:
generating the likelihood indication based on a proximity of the second map tile to the first map tile in a map.

17. The computing device of claim 15, wherein generating the likelihood indication comprises:
generating the likelihood indication based at least upon a behavior of a user of the client application with respect to the desired content.

18. The computing device of claim 17, wherein the desired content includes a first content item and the additional content includes a second content item, and said generating the likelihood indication based at least upon a behavior of a user of the client application with respect to the desired content comprises:
    generating the likelihood indication based on whether the user of the computing device pans in a direction of the second content item.

19. The computing device of claim 15, wherein generating the likelihood indication comprises:
    generating the likelihood indication based at least upon a type of content of at least one of the desired content or the additional content.

20. The computing device of claim 19, wherein generating the likelihood indication based at least upon a type of content of at least one of the desired content or the additional content comprises:
    generating the high likelihood value for a video frame in a video stream that immediately follows an additional video frame viewed using the client application.

\* \* \* \* \*